United States Patent [19]
Neff

[11] 3,926,062
[45] Dec. 16, 1975

[54] LINEAR MEASURING APPARATUS

[75] Inventor: Frederick R. Neff, Des Plaines, Ill.

[73] Assignee: A & A Engineering Co., Franklin Park, Ill.

[22] Filed: Oct. 24, 1973

[21] Appl. No.: 409,175

[52] U.S. Cl. .............................. 74/89; 74/25; 73/1
[51] Int. Cl. ........................................... F16h 27/02
[58] Field of Search ................ 74/29, 89, 25; 73/1; 33/142, 125, 134

[56] References Cited
UNITED STATES PATENTS

| | | | |
|---|---|---|---|
| 3,585,875 | 6/1971 | Adams | 74/29 |
| 3,688,410 | 9/1972 | Zeidler et al. | 33/142 |
| 3,709,050 | 1/1973 | Granger | 74/29 |
| 3,731,388 | 5/1973 | Burroughs | 33/125 |

FOREIGN PATENTS OR APPLICATIONS

| | | | |
|---|---|---|---|
| 238,857 | 8/1945 | Switzerland | 33/125 |

*Primary Examiner*—Wesley S. Ratliff, Jr.
*Attorney, Agent, or Firm*—Hofgren, Wegner, Allen, Stellman & McCord

[57] ABSTRACT

An apparatus for providing a rotary output corresponding accurately to linear motion of a movable member such as a machine tool bed. The apparatus includes means for adjustably constricting an output roller to adjust the amount of rotation thereof effected by a rolling movement thereof against an elongated actuator element. The actuator element is mounted in a cantilevered fashion to provide improved transfer of force therethrough from an adjustable pressure device to effect the desired constriction of the output roller notwithstanding uneven movement of the machine tool movable member.

21 Claims, 7 Drawing Figures

U.S. Patent   Dec. 16, 1975   3,926,062
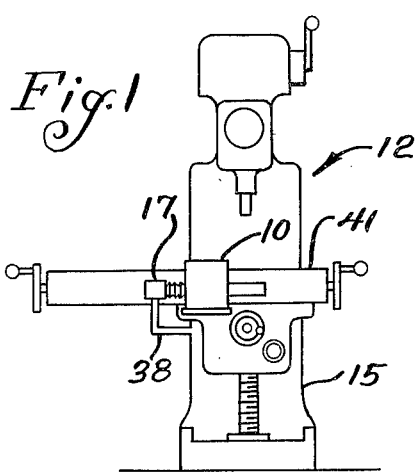
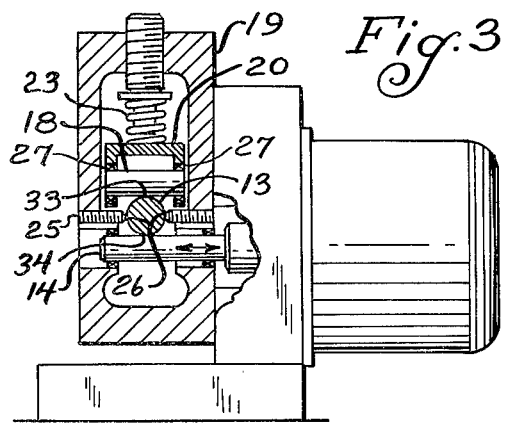
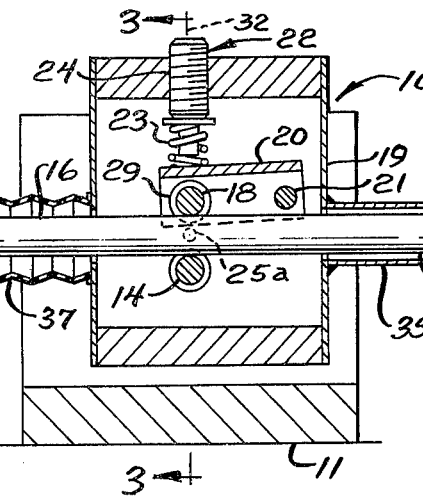
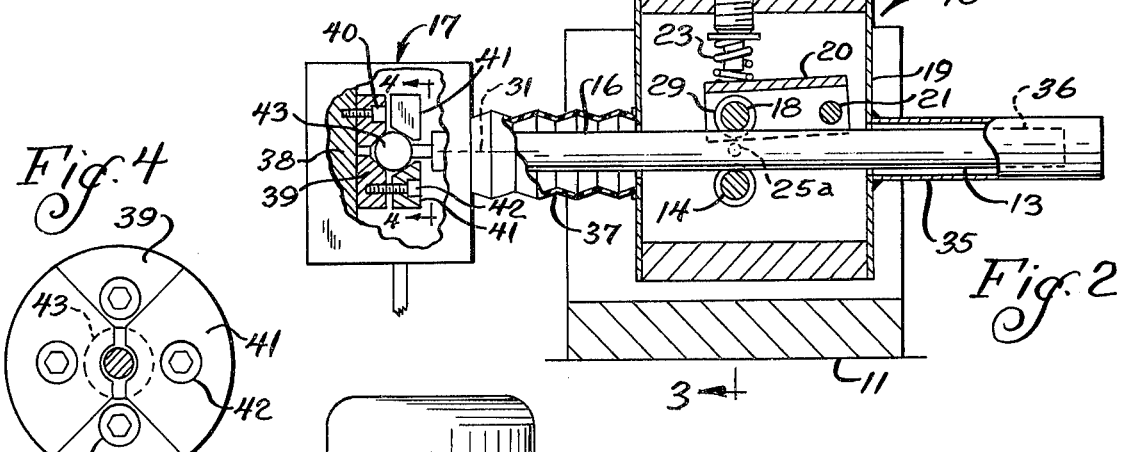
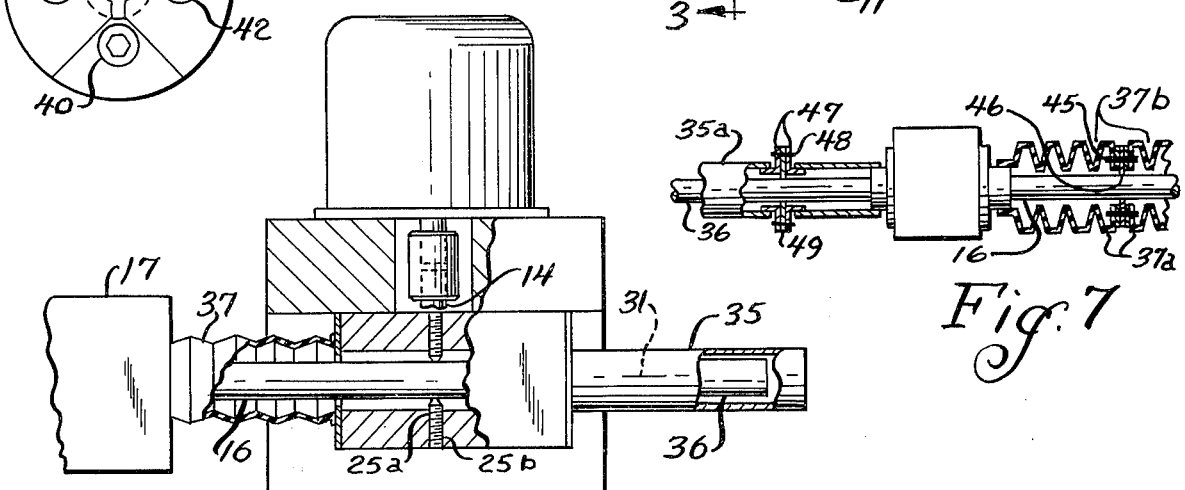
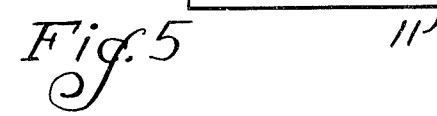
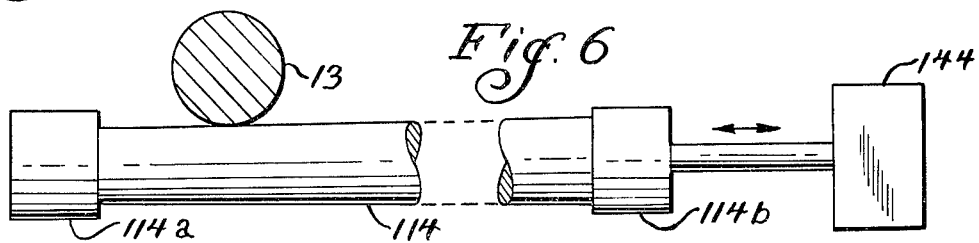

LINEAR MEASURING APPARATUS

BACKGROUND OF THE INVENTION

1. Field of the Invention

This invention relates to motion transducers and in particular to devices for indicating the travel of a movable member such as in a machine tool for accurate operation thereof.

2. Description of the Prior Art

In conventional machine tools, such as lathes, boring mills, and the like, movable members are incorporated which travel between preselected positions in the machining operation. It is desirable to provide an accurate indication of this travel for increased accuracy in the machining operation. One improved measuring device for use with such machine tools is illustrated in U.S. Pat. No. 2,663,598 of Joseph Verderber. Thus, as shown therein, an elongated bar is provided along which a spindle is rolled to define a transducer converting the linear movement of the means carrying the spindle into a rotary output driving a plurality of gauges. The bar is maintained in rolling contact with the spindle by a roller which is urged against the bar by an adjustable spring. The pin has a slight taper and the confronting surface of the bar is inclined to correspond with the taper to permit an accurate adjustment of the frictional pressure between the pin and bar and insure operative contact therebetween. The bar has a sliding fit in recesses at opposite ends of an outer casing. One wall of the casing is attached to the movable work table of the machine tool. To reset the gauges, the pressure roller is withdrawn from engagement with the bar to relieve the pressure of the bar against the spindle.

The more recent U.S. Pat. No. of Malina et al. 3,526,890, shows a linear tape transducer wherein a pressure roller is urged against a flat tape which, in turn, drives a metering roller to provide a readout of the travel of the tape.

The W. E. Petersen U.S. Pat. No. 3,318,005 shows a strand measuring device wherein a metal strand is urged against a measuring roller by a spring biased roller.

Another form of measuring system utilizing a metering roller is shown in U.S. Pat. No. 3,688,410 issued to Herman Rudolf Zeidler et al. This patent distinguishes from the Verderber structure in providing a single roller in abutment with the linear member and means for biasing that single roller against the linear member to obtain a desired degree of friction between the rotatably output member and the linear measuring member. The Zeidler et al. structure has the serious disadvantage of requiring a high thrust force action developed by the spring to accommodate both deflection of the linear member and the desired degree of frictional engagement.

In the U.S. Pat. No. 3,436,954 of W. T. Eppler, an apparatus for calibrating a cable measuring device is shown to utilize a frustoconical serrated roller which is axially adjustable to provide a degree of calibration.

Other pertinent patents include U.S. Pat. Nos. 3,561,120 and 3,561,121 of I. H. Culver.

SUMMARY OF THE INVENTION

The present invention comprehends an improved motion transducer apparatus wherein extremely high accuracies are obtained by adjustably constricting an output measuring roller adapted to roll against a linear actuator element with the relative movement therebetween corresponding exactly to the linear movement of the machine tool movable member. The present invention assures a constant constriction of the output roller notwithstanding vertical or lateral displacement of the work relative to the output roller. To achieve high accuracy, a pressure roller is urged against the actuator element which, in turn, constricts the measuring roller to a desired effective diameter.

More specifically, the present invention comprehends providing an adjustable means for holding one end of the actuator element while permitting the portion thereof engaged by the output roller to have substantial freedom of movement in a direction toward the output roller permitting a pressure-applying device to act through the freely movable actuator element for adjustably constricting the output roller to provide improved high accuracy in the measuring operation as discussed above.

The actuator element may be restricted relative to freedom of movement in a direction perpendicular to the line of action of the pressure device through the actuator element to the output roller so as to maintain the actuator element in accurately positioned relationship to the output roller in a desired point contact rolling engagement therewith. In the illustrated embodiment, the means for holding the fixed end of the actuator element comprises a universal joint means, and more specifically, a ball joint means. The means for precluding lateral movement of the actuator element adjacent the output roller may comprise slide elements having a slipfit with the actuator element thereat.

Thus, the invention broadly comprehends providing an elongated actuator element having a freedom of movement preselected to permit a compressive force to be delivered freely through the actuator element to effect an adjustable constriction of a diametrically opposed output roller. This improved structural concept permits extreme high accuracy in the correlation of the rotary output of the output roller with the linear movement of the machine tool movable member. This improved functioning is obtained at extremely low cost and by means of extremely simple structure requiring effectively minimum maintenance.

BRIEF DESCRIPTION OF THE DRAWING

Other features and advantages of the invention will be apparent from the following description taken in connection with the accompanying drawing wherein:

FIG. 1 is a schematic front elevation of a machine tool having a motion travel transducer apparatus embodying the invention associated therewith;

FIG. 2 is a fragmentary enlarged front elevation of the transducer apparatus;

FIG. 3 is a vertical section taken substantially along the line 3—3 of FIG. 2;

FIG. 4 is a fragmentary vertical section taken substantially along the line 4—4 of FIG. 2;

FIG. 5 is a top plan view of the machine tool transducer apparatus;

FIG. 6 is a fragmentary side elevation of a modified form of the output roller means; and FIG. 7 is a fragmentary longitudinal broken section, illustrating a modified form of transducer apparatus embodying the invention.

DESCRIPTION OF THE PREFERRED EMBODIMENT

In the exemplary embodiment of the invention as disclosed in FIGS. 1–5 of the drawing, an apparatus generally designated 10 for providing an indication of the movement of a movable member such as the bed 11 of a machine tool 12 is shown to include an elongated actuator element in the form of a rod 13 and an output roller 14 arranged to have rolling engagement with the rod 13 for providing an output such as suitable for operating gauges, digital readout means, etc.

Relative movement between the roller 14 and rod 13 is caused to correspond accurately to the movement of the bed 11 on the base 15 of the machine tool so that the output signal provides an accurate indication of the linear motion of the machine tool bed for facilitatting maching operations. In the illustrated embodiment, roller 14 is mounted to have rotation about an axis that is transversely movable with the machine tool bed 11 whereas the rod 13 is held at one end 16 by a holding means 17 which is fixed relative to the base 15. As will be obvious to those skilled in the art, a reverse arrangement wherein the rod moves with the bed 11 and the output roller axis is fixed relative to the base is equally comprehended within the scope of the invention.

As illustrated in FIG. 1, the rod holder 17 comprises a universal joint device, and more specifically, a ball joint device permitting the rod to be cantilevered therefrom to extend adjacent output roller 14. As seen in FIGS. 2, 3 and 5, the rod is received between the output roller 14 and an upper pressure roller 18. Output roller 14 is rotatably mounted on a mounting member 19 for movement with the machine tool bed 11 and the pressure roller device 18 includes a carrier 20 pivotally mounted to mounting member 19 by a pivot 21. Pressure roller 18 is forcibly urged toward output roller 14 by an adjustable spring device generally designated 22 including a coil spring 23 bearing against carrier 20 and an adjustable screw spring retainer 24 fixed to the mounting member 19.

Thus, pressure roller 18 is caused to transmit a force through the rod 13 against output roller 14 for selectively constricting the output roller and thereby changing the effective diameter thereof to bring the diameter accurately to a preselected diameter for high accuracy in the measurement of the movement of the tool member. Such diameter change may be in the order of millionths of an inch and, thus, adjustment of screw 24 may be utilized to effect an accurate calibration of the apparatus. As the rod 13 is freely movable in a direction between pressure roller 18 and output roller 14, the force transmission from adjustable device 22 is unimpeded and deflection of rod 13 is effectively avoided.

It is desirable to maintain rod 13 accurately centered so as to dispose the vertical diameter thereof in accurate maintained centered relationship with the output roller 14 and pressure roller 18. To this end, a pair of side guides 25 is provided at diametrically opposite positions 26 of the rod having a slipfit with the rod to maintain the rod accurately in maintained alignment with the rollers and device 22. As shown in FIG. 3, each side guide 25 includes a pair of set screws 25a and 25b threaded through mounting member 19 with the inner set screw threaded to have a slipfit engagement with the rod and the outer set screw threaded into locking relationship with the inner set screw to maintain the adjusted setting.

As further shown in FIG. 3, pressure roller 18 is journalled between the legs 27 of carrier 20. Suitable ball bearings 29 may be provided for mounting roller 18 in the carrier 20 for free rotation thereof. Coil spring 23 bears against the top side of carrier 20 to urge the roller 18 forcibly against rod 13. Output roller 14 is similarly journalled in ball bearings 30 in mounting member 19.

It has been found that in actual practice, the travel of a movable machine tool member, such as bed 11, is not truly rectilinear, but rather, some undesirable lateral shifting may occur in the travel. By virtue of the universal joint connection of the rod 13 to the machine tool base, any such lateral displacement of the output roller 14 does not affect the accuracy of the reading. Thus, as shown in FIGS. 2 and 3, the rod portions 26 are diametrically opposite portions of the rod defined by the intersection of a first plane defined by the longitudinal axis 31 of the rod and the diametric line 32 defining the engagement of the pressure roller 18 and output roller 14 with the top and bottom of the rod, respectively, and a second plane defined by the longitudinal axis 31 and extending perpendicularly to the diametric line 32. Regardless of the nonlinearity of the movement of the mounting member 19 with the machine tool bed, the points of engagement 33 and 34 are substantially maintained because of the floating, cantilevered arrangement of the rod 13 and the accurate retention of the rod against lateral displacement by the side guides 25.

Resultingly, the force developed by spring 23 is transmitted from pressure roller 18 freely through the rod 13 to constrict the output roller 14 as a function of the adjusted pressure. As the constriction may be in the order of millionths of an inch, the diameter of the output roller is correspondingly very finely adjusted to provide an adjustment in the amount of rotation effected by a given linear movement of the rod 13 relative to the roller.

To provide improved operation of the transducer apparatus 10, the apparatus may be effectively enclosed. Thus, as shown in FIG. 2, the mounting member 19 may be provided with a tubular cap 35 projecting outwardly for telescopic reception of the distal end 36 of rod 13. The end 16 of the rod may be enclosed by suitable collapsible bellowslike housing 37 extending between mounting member 19 and a mounting plate 38 carrying the ball joint 17.

As shown in FIGS. 3 and 4, the ball joint 17 may comprise a base element 39 secured to the housing 38 by suitable means such as cap screws 40 and a pair of complementary cover elements 41 secured to the base elements 39 by cap screws 42 capturing the ball 43 attached to the end 16 of rod 13.

To calibrate the travel indicating transducer, the operator need merely move the machine tool bed 11 a preselected distance which may be accurately determined by suitable conventional gauging means. The readout from the output roller 14, which as indicated above may be by any suitable readout means such as a digital readout means, is then observed and compared with the gauged dimension. If the readout shows a travel higher than the actual travel, the tension of spring 23 is increased so as to cause a slight constriction of the output roller and the machine tool bed again moved through the preselected travel distance with the new readout being then compared with the measured travel and a further correction of the readout effected by suitable constriction or relaxation of the output roller by a corresponding adjustment of the spring tension. The point contact engagement of the rollers with the rod at points 33 and 34 in combination with the universal joint connection of the rod 13 effectively assures a maintained high accuracy in the operation of the transducer apparatus. The forcible urging of the rod against the output roller further serves to provide suitable frictional engagement therebetween to provide maintained accuracy in the tracking of the roller relative to the rod. As the side guides are centered on the vertical line 32, undesirable lateral displacement by skewing of the rod is effectively eliminated thereby further maintaining high accuracy in the operation of the apparatus. As the axis of coil spring 23 coincides with the line 32, the constrictive force is similarly maintained diametric to the output roller 14 further assuring maintained accuracy in the operation of the apparatus.

The apparatus is adapted for long, trouble-free life. Adjustment of the side guides may be readily effected when necessary to maintain the desired slipfit relationship with rod 13.

In the embodiment of FIGS. 1-5, output roller 14 comprises a highly accurately lapped cylindrical roller. If desired, means (not shown) may be provided for selectively axially positioning the roller 14 to present different portions thereof at position 34 thereby to further prevent wear of the rod by the engagement therewith of rollers 18 and 14 from adversely affecting the desired accuracy.

As shown in FIG. 6, a modified form of output roller 114 may be provided for providing further facilitated calibration of the apparatus. Thus, as shown, roller 114 includes a pair of cylindrical end portions 114a and 114b and a slightly tapered center portion 114c. A suitable adjustable device 144 may be connected to end portion 114b for axially translating the roller to present different diameter portions of the center 114c in engagement with the actuator element 13 thereby providing a second means for changing the effective diameter of the actuator element. Thus, device 144 may provide a coarse adjustment of the diameter to bring the calibration to illustratively under 10-millionths of an inch or so and the final adjustment effected by the constriction of the roller by spring device 22 as discussed above.

As further discussed above, any suitable output device may be connected to the roller for providing an output reading or indication of the machine tool movable member travel. The use of a suitable encoder and digital readout provides an improved facilitated readout of the movable member travel which, as discussed above, is extremely accurate while yet the transducer apparatus 10 is extremely simple and economical of construction.

By virtue of the effective pinching of the rod 13 between the pressure element 18 and output roller 14 and the universal joint connection of the rod by the holding means 17, deflection of the rod is effectively eliminated, thereby eliminating deformation of the rod which may adversely affect the accuracy as in conventional devices which variably bend the rod in applying the frictional engagement pressure and wherein lateral movement of the rod occurs as a result of lateral movement of the machine tool table, such as in the Zeidler et al. patent structure discussed above.

The use of the universal ball connection at the end of the rod, together with the disposition of the side guides centered on the vertical line 32, permits the pinching of the rod 13 to be maintained effectively constant and thereby maintaining the metering roller axis accurately positioned relative to the rod notwithstanding irregular movement of the movable machine tool member such as rising or falling thereof, or skewing thereof in the movement of the member. The modulus of elasticity of the materials of both the rod and metering roller are maintained effectively constant by the maintained constant pressure of the pinching action so as to provide maintained high accuracy in the operation of the apparatus.

As illustrated in FIG. 7, where the movement of the tool member is relatively large, the rod may be supported by vibration damping supports spaced longitudinally from the point of engagement of the metering roller therewith. Thus, as shown, the end 16 of the rod may be enclosed by a plurality of bellows portions 37a having opposed ends 37b clamped together by suitable securing means 45 to support therebetween a damping element 46. The element 46 may be formed of nylon or other suitable damping material permitting relatively free movement of the rod therethrough while yet providing a damping support of the rod as illustrated. As further illustrated, a plurality of such damping elements may be provided depending on the overall length of the rod.

Further as shown in FIG. 7, the tubular cap enclosing the outboard end of the rod may comprise a plurality of tubular elements 35a joined by suitable flange portions 47 and securing means 48 to clamp therebetween a damping element 49 which may be similar to damping element 46 for providing damping support of the outboard end 36 of the rod.

As discussed above, the provision of means for effectively enclosing the rod provides improved maintained trouble-free, accurate operation of the apparatus by preventing subjection of the measuring means to foreign material, such as dirt and lubricant materials commonly present in machine tool installations.

The foregoing disclosure of specific embodiments is illustrative of the broad inventive concepts comprehended by the invention.

I claim:

1. Apparatus for providing a rotary output corresponding accurately to linear movement of a movable member, comprising: a cylindrical output roller; means supporting said roller for rotation about an axis of rotation; an elongated actuator element having a circular cross section; holding means for positioning the actuator element in point contact engagement with said output roller and extending substantially normally to the axis thereof; means applying a pressure force against said actuator element, said force acting through said actuator element and against said output roller through said point contact at a position spaced from said one end for causing the actuator element to be forcibly urged against said output roller whereby said actuator element has effectively positive driving engagement with said output roller, said force applying means concurrently adjustably constricting said output roller relative to said axis of rotation to adjust the amount of rotation thereof effected by longitudinal movement of said actuator element; and means for causing relative movement between the output roller and the actuator element to effect a rolling of the output roller along the longitudinal extent of the actuator element corresponding to linear movement of the movable member.

2. Apparatus for providing a rotary output corresponding accurately to linear movement of a movable member, comprising: a cylindrical output roller; means supporting said roller for rotation about an axis of rotation; an elongated actuator element having a circular cross section; holding means for positioning the actuator element in point contact engagement with said output roller and extending substantially normally to the axis thereof, said holding means defining means permitting free movement of said actuator element in a direction normal to the elongated extent thereof; means applying a pressure force against said actuator element, said force acting through said actuator element and against said output roller through said point contact at a position spaced from said one end for causing the actuator element to be forcibly urged against said output roller whereby said actuator element has effectively positive driving engagement with said output roller, said force applying means concurrently adjustably constricting said output roller relative to said axis of rotation to adjust the amount of rotation thereof effected by longitudinal movement of said actuator element; and means for causing relative movement between the output roller and the holding means to effect a rolling of the output roller along the longitudinal extent of the actuator element corresponding to linear movement of the movable member.

3. Apparatus for providing a rotary output corresponding accurately to linear movement of a movable member, comprising: an output roller defining an axis of rotation; an elongated actuator element having a circular cross section; holding means for holding one end of the actuator element with the actuator element in point contact engagement with said output roller and extending substantially normally to the axis thereof; means acting through said actuator element at a position spaced from said one end for causing the actuator element to be in driving engagement with said output roller and concurrently adjustably constricting said output roller to adjust the amount of rotation thereof effected by longitudinal movement of said actuator element; means for causing relative movement between the output roller and the holding means to effect a rolling of the output roller along the longitudinal extent of the actuator element corresponding to linear movement of the movable member, said holding means comprising a universal joint; and means adjacent said output roller for precluding transverse displacement of the actuator element parallel to the axis of the output roller thereat while permitting substantially free movement perpendicular thereto for transfer of force from said constricting means freely through said actuator element to said output roller.

4. The apparatus of claim 1 wherein said force applying means comprises a pressure member, and resilient means urging said pressure member against said actuator element and said actuator element in turn constrictively against said output roller.

5. The apparatus of claim 1 wherein means are provided for mounting said output roller for rotation about an axis fixedly positioned relative to said movable member.

6. The apparatus of claim 1 wherein said holding means is fixedly positioned, and said output roller is mounted for movement with said movable member.

7. Apparatus for providing a rotary output corresponding accurately to linear movement of a movable member, comprising: an output roller defining an axis of rotation; an elongated actuator element having a circular cross section; holding means for holding the actuator element in point contact engagement with said output roller and extending substantially normally to the axis thereof; pinching means acting through said actuator element and against said output roller through said point contact at a position spaced from said one end for causing the actuator element to be pinched therebetween and have driving engagement with said output roller, said pinching means concurrently adjustably constricting said output roller to adjust the amount of rotation thereof effected by longitudinal movement of said actuator element; and means for causing relative movement between the output roller and the holding means to effect a rolling of the output roller along the longitudinal extent of the actuator element corresponding to linear movement of the movable member, said holding means comprising a ball joint at one end of the actuator element, the actuator element being cantilevered therefrom.

8. Apparatus for providing a rotary output corresponding accurately to linear movement of a movable member, comprising: an output roller defining an axis of rotation; an elongated actuator element having a circular cross section; universal joint means for holding one end of the actuator element with the actuator element catilevered therefrom to be in point contact engagement with said output roller and extending substantially normally to the axis thereof; a spring biased pressure device acting through said actuator element toward said output roller for causing the actuator element to be in driving engagement with said output roller and concurrently adjustably constricting said output roller to adjust the amount of rotation thereof effected by longitudinal movement of said actuator element; and means for causing relative movement between the output roller and the holding means to effect a rolling of the output roller along the longitudinal extent of the actuator element corresponding to linear movement of the movable member.

9. The apparatus of claim 8 wherein said pressure device includes a pressure roller engaging said actuator element diametrically oppositely of said output roller.

10. The apparatus of claim 8 wherein said pressure device includes a pressure roller engaging said actuator element diametrically oppositely of said output roller and coil spring means aligned coaxially with the diametric line defining the engagement of said pressure roller and output roller.

11. The apparatus of claim 8 further including means for sealingly enclosing said output roller, actuator, universal joint and pressure device.

12. The apparatus of claim 8 further including means adjacent said output roller for preventing thereat movement of the actuator element parallel to the axis of said output roller.

13. The apparatus of claim 8 wherein said pressure device includes a pressure roller engaging said actuator element diametrically oppositely of said output roller and said apparatus further includes means acting against said actuator element at diametrically opposite parts thereof defined by the intersection of a first plane defined by the longitudinal axis of actuator element and the diametric line defining the engagement of said pressure roller and output roller and a second plane defined by said longitudinal axis and extending perpendicular to said diametric line.

14. The apparatus of claim 8 wherein said pressure device includes a pressure roller engaging said actuator element diametrically oppositely of said output roller and said apparatus further includes slide elements having a slipfit with said actuator element at diametrically opposite parts thereof defined by the intersection of a first plane defined by the longitudinal axis of actuator element and the diametric line defining the engagement of said pressure roller and output roller and a second plane defined by said longitudinal axis and extending perpendicular to said diametric line.

15. The apparatus of claim 8 wherein said universal joint comprises a ball joint.

16. The apparatus of claim 8 wherein means are provided for damping movement of the actuator element laterally of the axis thereof.

17. The apparatus of claim 8 wherein means are provided at a portion of the rod spaced longitudinally of the rod from the line of action of the pressure device therethrough for damping movement of the actuator element laterally of the axis thereof.

18. The apparatus of claim 8 wherein means are provided at portions of the rod spaced longitudinally of the rod in opposite directions from the line of action of the pressure device therethrough for damping movement of the actuator element laterally of the axis thereof.

19. The apparatus of claim 8 wherein enclosure means are provided surrounding the rod to prevent contact of foreign material with the rod in the operation of the apparatus.

20. The apparatus of claim 8 wherein enclosure means are provided surrounding the rod to prevent contact of foreign material with the rod in the operation of the apparatus, said enclosure means being provided with means for damping movement of the actuator element laterally of the axis thereof.

21. The apparatus of claim 8 wherein means are provided for slidably supporting the rod at a portion of the rod spaced longitudinally of the rod from the line of action of the pressure device therethrough and damping movement of the actuator element laterally of the axis thereof.

* * * * *